United States Patent
Njoo et al.

(10) Patent No.: US 10,730,216 B2
(45) Date of Patent: Aug. 4, 2020

(54) INJECTION MOULDING APPARATUS AND METHOD FOR INJECTION MOULDING AND IR-COMPATIBLE DISPLAY FRAME

(71) Applicant: UNIPLAS ENTERPRISES PTE LTD, Singapore (SG)

(72) Inventors: Soe Zen Njoo, Singapore (SG); Kar Cheong Lim, Singapore (SG)

(73) Assignee: Uniplas Enterprises Pte. Ltd., Singapore (SG)

( * ) Notice: Subject to any disclaimer, the term of this patent is extended or adjusted under 35 U.S.C. 154(b) by 30 days.

(21) Appl. No.: 15/751,439

(22) PCT Filed: Oct. 13, 2015

(86) PCT No.: PCT/SG2015/050386
§ 371 (c)(1),
(2) Date: Feb. 8, 2018

(87) PCT Pub. No.: WO2017/039531
PCT Pub. Date: Mar. 9, 2017

(65) Prior Publication Data
US 2018/0229413 A1      Aug. 16, 2018

(30) Foreign Application Priority Data
Aug. 31, 2015   (SG) .......................... 10201506872Q (51) Int. Cl.
*G06F 3/042*      (2006.01)
*B29C 45/57*      (2006.01)
(Continued)

(52) U.S. Cl.
CPC ............ *B29C 45/572* (2013.01); *B29C 45/04* (2013.01); *B29C 45/14065* (2013.01);
(Continued)

(58) Field of Classification Search
CPC ..... B29C 45/572; B29C 45/561; B29C 45/04; B29C 45/14065; B29C 45/14336;
(Continued)

(56) References Cited

U.S. PATENT DOCUMENTS 9,207,800 B1 * 12/2015 Eriksson ................. G06F 3/041
2007/0231955 A1   10/2007 Liu
(Continued)

FOREIGN PATENT DOCUMENTS

DE     10 2010 016350 A1    10/2011
EP          0 333 198 A2     9/1989
(Continued)

OTHER PUBLICATIONS

International Search Report dated Jun. 14, 2016 in International Application No. PCT/SG2015/050386, filed Oct. 13, 2015, in 2 pages.

(Continued)

*Primary Examiner* — Ibrahim A Khan
(74) *Attorney, Agent, or Firm* — Knobbe Martens Olson & Bear LLP (57) ABSTRACT

An injection moulding apparatus and method for producing a moulded article is disclosed herein. In a described embodiment, the method comprises: (i) securing a layer of film to a part of a first mould half at step 504; (ii) adjusting relative position of the first mould component and a second mould component to an initial moulding position at step 506 to define a mould cavity; (iii) injecting molten moulding material into the mould cavity at step 508 to enable the molten moulding material to contact the layer of protective film; (iv) moving a movable core at step 510 to compress the molten moulding material in the mould cavity; and (v) cooling the (Continued)

compressed molten moulding material at step 514 to bond the layer of film to the cooled moulding material to form the moulded article.

3 Claims, 8 Drawing Sheets

(51) Int. Cl.
| | |
|---|---|
| *B29C 45/04* | (2006.01) |
| *B29C 45/14* | (2006.01) |
| *B29C 45/26* | (2006.01) |
| *B29C 45/56* | (2006.01) |
| *B29C 45/72* | (2006.01) |
| *G02B 6/42* | (2006.01) |
| *B29L 31/34* | (2006.01) |
| *G02B 6/43* | (2006.01) |

(52) U.S. Cl.
CPC .... *B29C 45/14336* (2013.01); *B29C 45/2606* (2013.01); *B29C 45/561* (2013.01); *B29C 45/7207* (2013.01); *G02B 6/4255* (2013.01); *G06F 3/0421* (2013.01); *B29C 2045/14122* (2013.01); *B29C 2045/5635* (2013.01); *B29C 2045/5665* (2013.01); *B29K 2995/0027* (2013.01); *B29L 2031/3475* (2013.01); *G02B 6/43* (2013.01); *G06F 2203/04103* (2013.01)

(58) Field of Classification Search
CPC ............ B29C 45/2606; B29C 45/7207; B29C 2045/5665; B29C 2045/5635; B29C 2045/14122; G02B 6/4255; G02B 6/43; G06F 3/0421; G06F 2203/04103; B29K 2995/0027; B29L 2031/3475
See application file for complete search history.

(56) References Cited

U.S. PATENT DOCUMENTS

| | | | |
|---|---|---|---|
| 2009/0009935 A1 | 1/2009 | Hsu et al. | |
| 2009/0009942 A1 | 1/2009 | Hsu et al. | |
| 2010/0225603 A1* | 9/2010 | Shimizu | G02B 6/12004 345/173 |
| 2011/0157097 A1* | 6/2011 | Hamada | G02F 1/13338 345/175 |
| 2011/0254809 A1* | 10/2011 | Yu | G06F 3/0421 345/175 |
| 2012/0098794 A1* | 4/2012 | Kleinert | G02B 27/0983 345/175 |
| 2012/0176343 A1* | 7/2012 | Holmgren | G06F 3/042 345/175 |
| 2012/0223916 A1* | 9/2012 | Kukulj | G06F 3/0421 345/175 |
| 2014/0028629 A1* | 1/2014 | Drumm | G06F 3/0308 345/175 |
| 2014/0104240 A1* | 4/2014 | Eriksson | G06F 1/169 345/175 |
| 2014/0178635 A1* | 6/2014 | Imaizumi | B60J 1/007 428/138 |
| 2015/0054740 A1* | 2/2015 | Berestov | G06F 3/017 345/157 |

FOREIGN PATENT DOCUMENTS

| | | |
|---|---|---|
| JP | 2002 070434 A | 3/2002 |
| JP | 5747188 B1 | 7/2015 |
| WO | WO 2015/152131 A1 | 10/2015 |

OTHER PUBLICATIONS

International Preliminary Report on Patentability dated Nov. 28, 2017 in International Application No. PCT/SG2015/050386, filed Oct. 13, 2015, in 15 pages.

* cited by examiner

INJECTION MOULDING APPARATUS AND METHOD FOR INJECTION MOULDING AND IR-COMPATIBLE DISPLAY FRAME

BACKGROUND AND FIELD

The invention relates to an injection moulding apparatus and method, more particularly but not exclusively, for producing a moulded article, such as an electronic display frame for tablets, pc-monitors, phones and other electronic devices.

With products becoming smaller, the moulding industry is presented with new challenges. In particular, moulding techniques need to achieve greater accuracy since with thinner parts, degree of tolerance for variations is much lower. Further, there are also greater demands for moulded products to have a "look and feel" which is aesthetically appealing to consumers.

As a result, it is known to execute in-molding of a plastic film. The plastic film itself (including all ink-layers), may only be 0.050-0.375 mm thick, and this has to be in-molded with thermoplastic material as a support material, while needing to achieve/retain multiple functions and features such as multi-color layers, special ink-systems, bonding layers, special film-material, and hard coats or soft-touch as required on the end-product. With current LED technology on the market, plastic parts may also carry symbols, numbers and characters which are back-lighted or where light is switched on and off during different functions.

Another industrial design feature is illumination of an outside or inside circumference of a plastic part, which needs incorporation of one or more groups of lights and/or optical light waveguides, while keeping the plastic part as thin as possible, such as, for example, when the product is an IR-touch tablet. The reasons why plastic parts should be as thin as possible include the following:
(a) the product is designed and engineered thinner and thinner;
(b) the weight of the product is engineered to be light;
(c) cost pressure leading to cheaper manufacturing techniques; and
(d) the design of the product may need to be more sophisticated through the use of lights and colors for visualizing functions, visualizing safety announcement, visualizing information, visualizing instructions or simply to enhance cosmetic appeal to the consumer and user. However, current moulding techniques are not efficient and moulding accuracy may be improved.

It is an object of the described embodiment to provide an injection moulding apparatus and method which addresses at least one of the disadvantages of the prior art and/or to provide the public with a useful choice.

SUMMARY

In a first aspect, there is provided an injection moulding method for producing a moulded article; comprising: securing a layer of film to a part of a first mould half; adjusting relative position of the first mould component and a second mould component to an initial moulding position to define a mould cavity; injecting molten moulding material into the mould cavity to enable the molten moulding material to contact the layer of protective film; moving a movable core to compress the molten moulding material in the mould cavity; and cooling the compressed molten moulding material to bond the layer of film to the cooled moulding material to form the moulded article.

The described embodiment is able to minimize sink marks on the moulded article, and is able to achieve a much thinner moulded article such as a wall thickness of 0.30 mm to 1.20 mm. Further, it is possible to minimize stress in the moulded article which is normally present from conventional high speed injection moulding of plastic resin. The described embodiment also minimizes warping, bending, twisting and distortion of the final moulded article.

In certain specific applications, step (iii) may include injecting the moulding material at a rate of 31 cc/sec. Step (v) may include cooling the compressed molten moulding material to a temperature of 60° C. Preferably, the moulded article may be an IR-compatible display frame for an IR-touch electronic device, and wherein the molten moulding material is IR-compatible.

In a second aspect, there is provided an injection moulding apparatus for producing a moulded article, comprising a first mould component having a first mould component moulding surface for securing a' layer of protective film thereto; a second mould component having a second mould component moulding surface, the second mould component including a movable core; an injection channel for enabling molten moulding material to be injected into a mould cavity; a moving mechanism for adjusting relative position between the first mould component and a second mould component to an initial moulding position to define the mould cavity; the second mould component including a movable core arranged to compress the molten moulding material in the mould cavity; and a cooling mechanism for cooling the compressed molten moulding material to bond the layer of protective film to the cooled moulding material to form the moulded article.

In a third aspect, there is provided an IR-compatible display frame for an IR-touch electronic device, the display frame comprising a frame body comprising an external surface having a protective film which terminates at or near a leading edge; and an optical waveguide protruding from the frame body and towards a body of the IR-touch electronic device and which allows IR light to pass through; the waveguide having an external wall from which the IR light exits the waveguide; wherein the external wall is spaced from the leading edge by a parting line offset.

In certain applications, the parting line offset may be in the range of 0.2 mm to 0.4 mm, or other dimensions are possible. Preferably, the optical waveguide is integrally formed with the frame body.

Specifically, there may be provided an IR-touch electronic device comprising the display frame of any of the above statements.

Examples of the display frame might be bezels for tablets or ebooks, mobile phones and frames for display monitors for personal computers or laptops, or other electronic devices.

In a second aspect, there is provided a moulding apparatus for producing a moulded article, comprising a first mould component having a first mould component moulding surface and a first mould component engagement surface which meets the first mould component moulding surface at first mould component moulding edge; a second mould component having a second mould component moulding surface and a second mould component engagement surface which meets the second mould component moulding surface at a second mould component moulding edge; the first and second mould components being movable relative to each other between an open position in which the moulded part is ejectable out of the first or second mould component, and a closed position in which the first and second mould components cooperate to form a moulding cavity, and the first mould component engagement surface is engaged with the second mould component engagement surface along a parting line; and wherein in the closed position, the first mould component moulding edge is spaced from the second mould component moulding edge by an offset along the parting line.

In view of the offset, the described embodiment is able to achieve a more accurate formation of an optical waveguide since an optical clearance can be formed precisely. If the moulded article includes an inlay, the described embodiment ensures that the inlay is prevented from protruding beyond a certain location, and also ensures that light is blocked from exiting the device where the design of the moulded article requires it to be so blocked.

Preferably, the first mould component may include a movable core. The second mould component moulding surface may be arranged to secure a layer of film. The moulding apparatus may further comprise an injection channel for injecting IR-compatible molten moulding material into the moulding cavity.

Preferably, the second mould component may include an optical waveguide cavity having a cavity wall which forms part of the second mould component moulding surface, the cavity wall arranged to meet the second mould component engagement surface at the second mould component edge.

It should be appreciated that features relevant to one aspect may also be relevant to the other aspect.

BRIEF DESCRIPTION OF THE DRAWINGS

An exemplary embodiment will now be described with reference to the accompanying drawings, in which.

DETAILED DESCRIPTION OF PREFERRED EMBODIMENT

Figure 1:
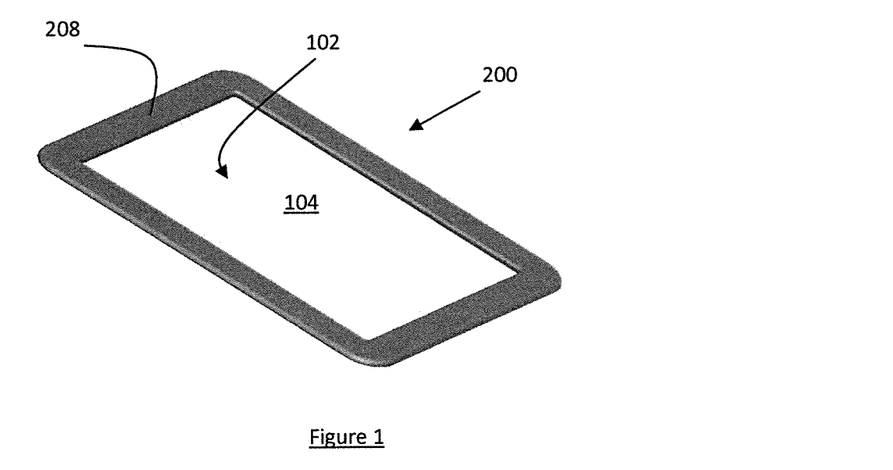
FIG. 1 is a perspective view of a display frame for an electronic device having a touch screen.

FIG. 1 is a perspective view of display frame 200 for an electronic device commonly called an ebook, which enables a user to store and view electronic documents, according to an embodiment of the invention. The display frame 200 is arranged to be mounted to a device body (not shown) of the ebook and around edges of an infrared touch screen 102 of the ebook to define a viewing area 104 for displaying the electronic information.

The infrared touch screen 102 allows a user to interact with the displayed contents of the ebook and the infrared touch screen 102 includes an array of infrared LED transmitter and detector pairs (not shown) arranged underneath a frame body 208 of the display frame 200. The array of X-Y infrared LED transmitter and detector pairs are arranged to create an infrared grid just on the screen's surface and when the infrared grid is disrupted (for example by a finger touching on the infrared touch screen 102), the exact location of the disruption is picked up by the detector.

In view of the above, the display frame 200 includes an optical clearance 204 (see FIG. 7) to allow light to be radiated by the LED transmitter (and received by the corresponding detector). However, with demand for flatter or thinner devices, there is a push to reduce the thickness of the display frame and this leads to greater challenges to reduce the optimum optical clearance and also thickness of the display frame 200.

Figure 2:
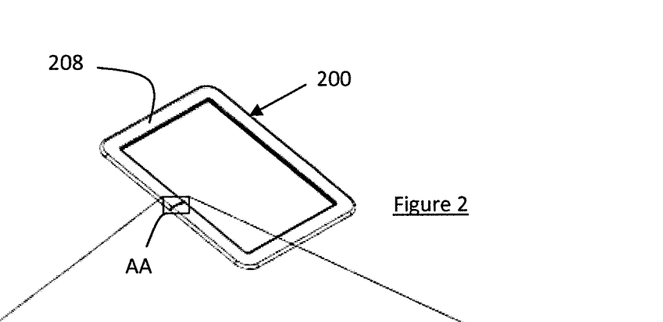
FIG. 2 is a schematic diagram of the display frame of FIG. 1.
Figure 3:
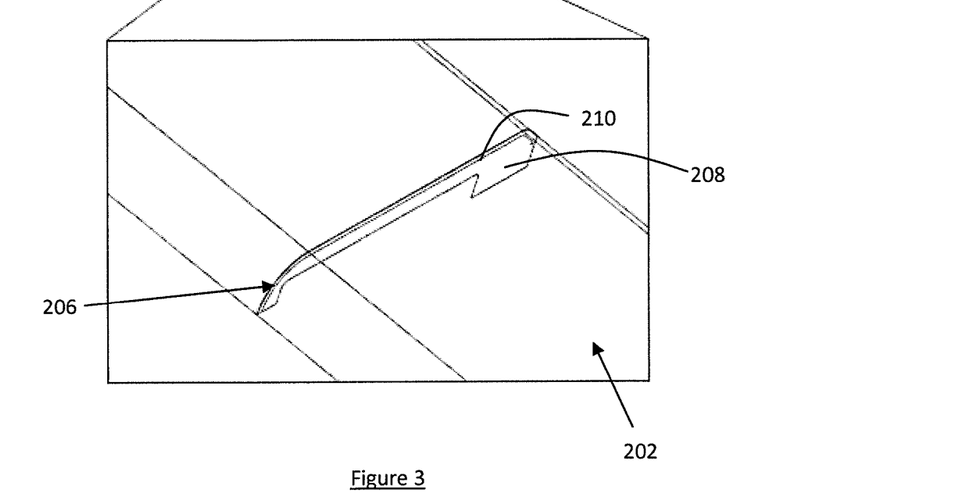
FIG. 3 shows an enlarged portion AA of the display frame in FIG. 2 and depicting a cross-sectional outline of the display frame.

FIG. 2 is a slightly reduced schematic diagram of the display frame 200 of to FIG. 1. FIG. 3 is an enlarged view of portion AA of the display frame 200 of FIG. 2 depicting a cross-sectional outline 206 of the display frame 200. As shown from the cross-sectional outline 206, the display frame 200 includes the frame body 208 and an inlay 210 bonded to the frame body 208.

Figure 4:
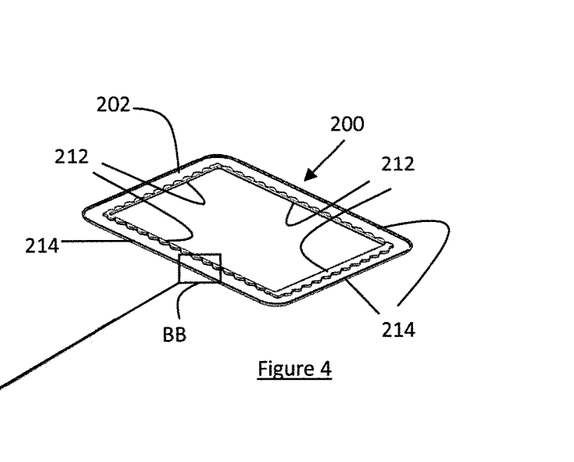
FIG. 4 is an underside view of the display frame of FIG. 2.
Figure 5:
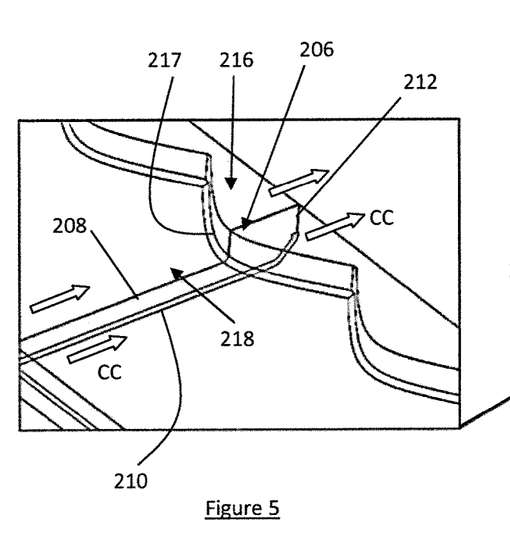
FIG. 5 is a magnified view of portion BB of FIG. 4 to show an optical waveguide.

FIG. 4 illustrates an underside view of the display frame 200 of FIG. 2, and FIG. 5 is a magnified view of portion BB of the display frame 200 of FIG. 2. FIG. 5 also illustrates the cross-sectional outline 206 illustrated in FIG. 3, but needless to say, the cross-sectional outline 206 is shown as inverted in FIG. 5. As illustrated in FIGS. 4 and 5, the frame body 208 includes an inner edge 212 and an outer edge 214 at a distal end of the inner edge 212. The frame body 208 includes an optical waveguide 216 protruding from the inner edge 212 with an undulating contour 217. The frame body 208 includes a channel 218 formed between the optical waveguide 216 and the outer edge 214. The array of LED transmitters are disposed at predetermined intervals near the outer edge to emit infrared red (IR) beams and the channel 218 is arranged to allow the IR light to pass through to the optical waveguide 216 with the IR light arranged to exit the waveguide 216 via the inner edge 212 (see block arrows CC in FIG. 5).

Figure 6:
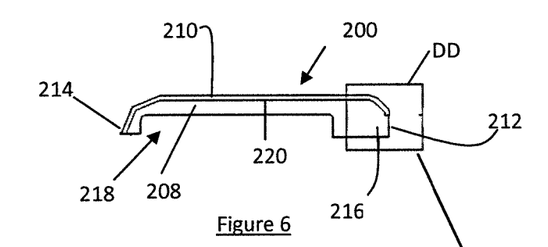
FIG. 6 is a view of the sectional outline of FIG. 3.
Figure 7:
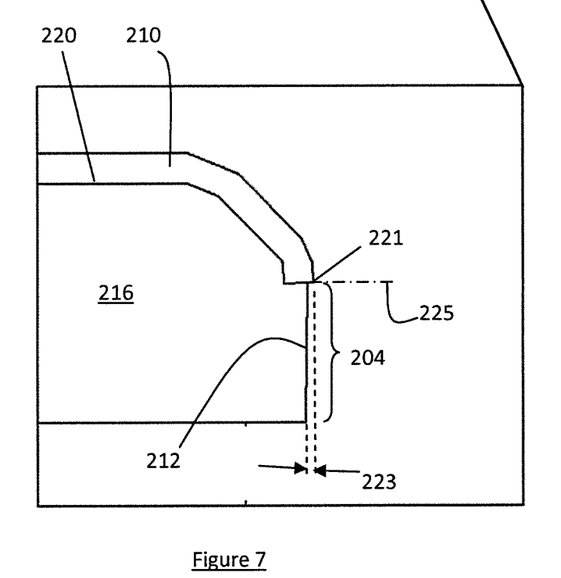
FIG. 7 is a magnified view of portion DD of FIG. 6.

FIG. 6 shows the cross-sectional outline 206 of FIG. 3 (which is also shown in FIG. 5 although inverted) and it should be appreciated that the inlay 210 is bonded to a top surface 220 of the frame body 208 and the inlay 210 is intended to provide means by which light from the LED transmitters is blocked from exiting the display frame except where desired. Thus, the inlay 210 should cover as much exposed surface area of the display frame 200 as required, and no more. Indeed, as shown in FIG. 7, which is a magnified view of portion DD of FIG. 6, the inlay 210 terminates at or near a leading edge 221 which is spaced from the inner edge 212 by a parting line offset 223 along a longitudinal axis 225 substantially perpendicular to a vertical axis of the inner edge 212 illustrated in FIG. 7. If the inlay 210 is not accurately bonded to the frame body 208, this may affect the optical clearance 204 which may then obstruct the transmission of the light beams by the LED transmitters and/or result in light exiting the display frame from where it should not do so. In the present embodiment, the optical clearance 204 would be around 0.935 mm.

Figure 8:
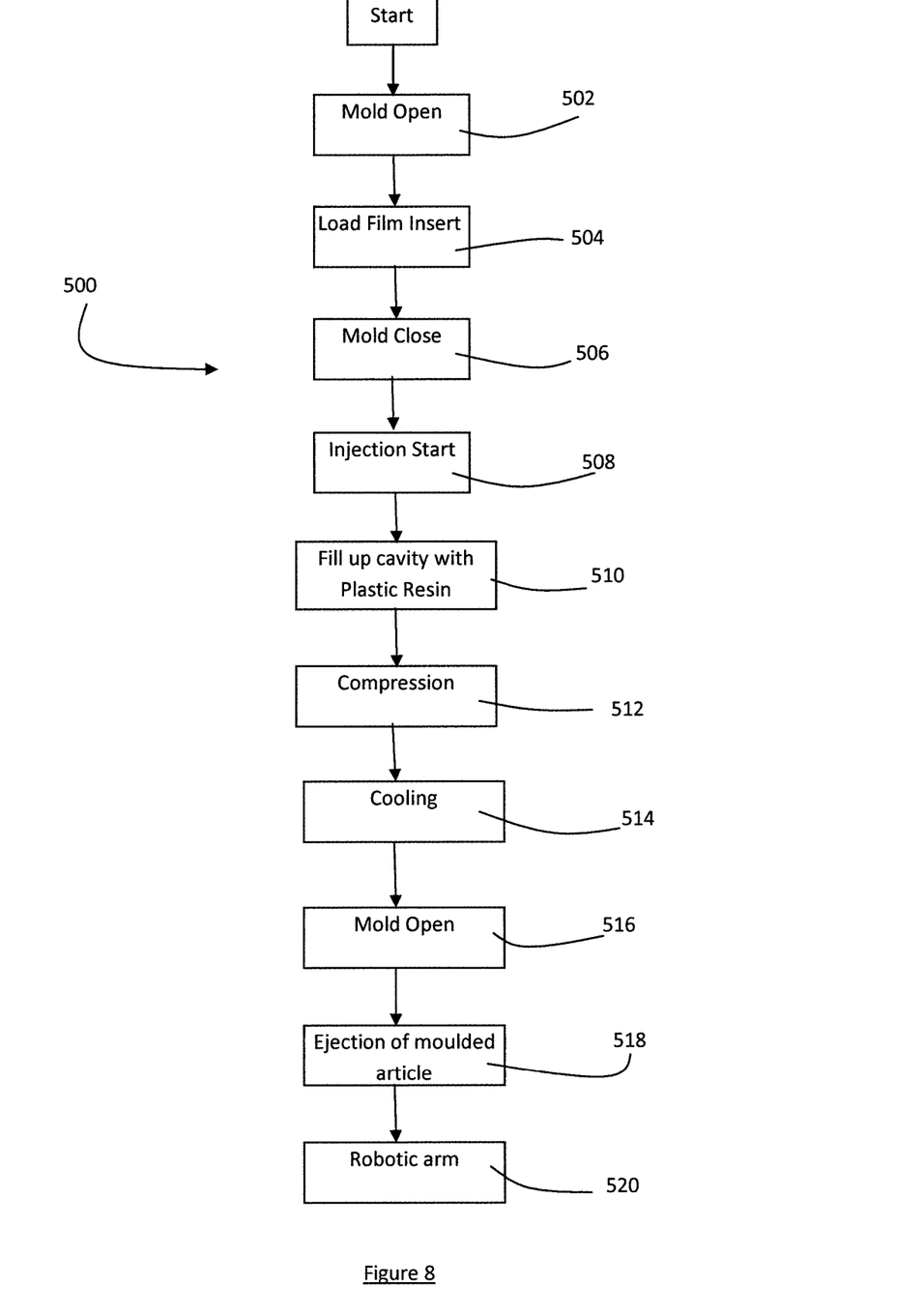
FIG. 8 is a flowchart depicting a general process flow for moulding the display frame of FIG. 2.

FIG. 8 is a flowchart illustrating a manufacturing process 500 for producing the display frame 200 and FIGS. 9 to 17 show an injection moulding is apparatus 600 at different stages of the manufacturing process.

Figure 9:
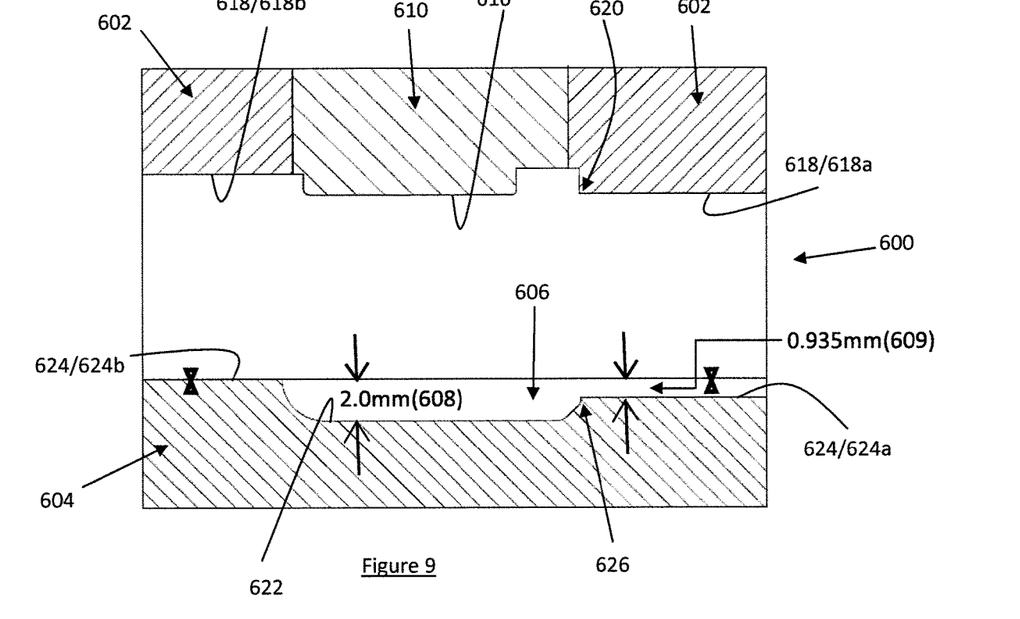
FIG. 9 show an injection moulding apparatus for performing the moulding method of FIG. 8 and includes an upper mould component and a lower mould component.

As shown in FIG. 9, the injection moulding apparatus 600 comprises an upper mould component 602 and a lower mould component 604 arranged opposite of the upper mould component 602. The lower mould component 604 includes a lower mould cavity 606 having a cavity depth 608 which corresponds substantially to the display frame's wall thickness. In this embodiment, the injection moulding apparatus 600 includes a hydraulic mechanism (not shown) for moving the upper mould component 602 relative to the lower mould component 604. The upper mould component 602 includes a movable core 610 and the purpose of this movable core 610 will be explained later.

Figure 10:
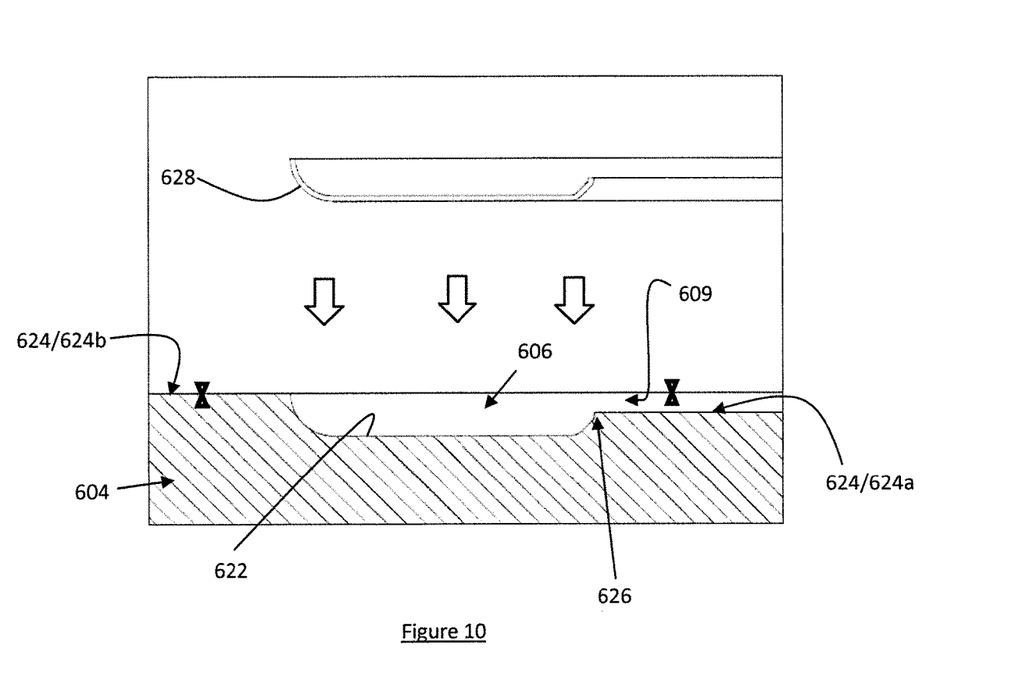
FIG. 10 illustrates a layer of film being positioned above a lower mould cavity of the lower mould component of FIG. 9.

In this embodiment, the cavity depth 608 is about 2 mm (although other values are possible, for example, from 0.3 mm to 1.20 mm) and the lower mould front engagement surface 624a sits lower than the lower mould rear engagement surface 624b to define an optical clearance gap 609 as shown in FIG. 10 which eventually forms the optical clearance 204 of the display frame of FIG. 7. In this embodiment, the optical clearance gap 609 is about 0.935 mm (although other values such as 0.50 to 2.00 mm may be selected).

The injection moulding apparatus 600 also includes an injection channel and hot runner valve gate needles, and these parts are not shown in the drawings, since these are well known in the art.

At step 502 of FIG. 8, the injection moulding apparatus 600 activates the hydraulic mechanism to move the upper mould component 602 to an open position relative to the lower mould component 604 as shown in FIG. 9. It should be appreciated that the upper mould component 602 includes an upper mould component moulding surface 616 disposed at the movable core 610 and an upper mould component engagement surface 618. In this embodiment, the upper mould component engagement surface 618 includes an upper mould front engagement surface 618a and an upper mould rear engagement surface 618b, and the upper mould front engagement surface 618a has an upper mould component moulding edge 620 which is a nearest outer edge to the upper mould component moulding surface 616. The lower mould component 604 includes a lower mould component moulding surface 622 and a lower mould component engagement surface 624. The lower mould component engagement surface 624 includes a lower mould front engagement surface 624a and a lower mould rear engagement surface 624b with the lower mould front engagement surface 624a arranged to meet the lower mould component moulding surface 622 at a lower mould component moulding edge 626.

Figure 11:
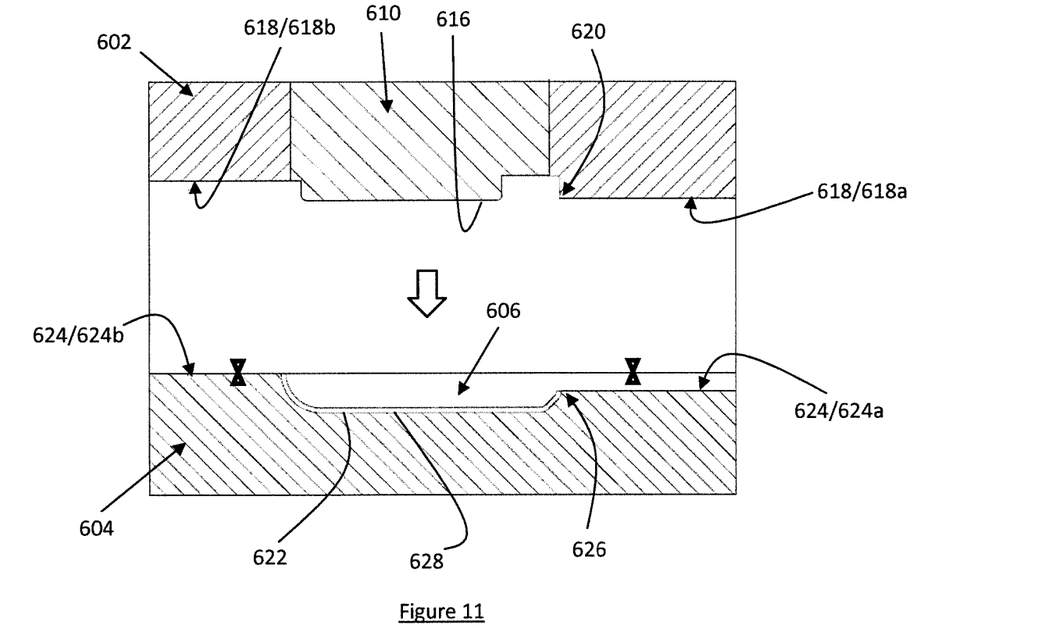
FIG. 11 illustrates the layer of film of FIG. 10 being lowered and secured to the lower mould cavity.

Next, at step 504, a layer of film 628 is positioned and secured to the lower mould cavity 606 against the lower mould component moulding surface 622 as shown in FIGS. 10 and 11, and it should be appreciated that the layer of film 628 becomes the inlay 210 in the finished product (i.e. when the layer of film 628 is bonded to the frame body 208).

Figures 12, 13:
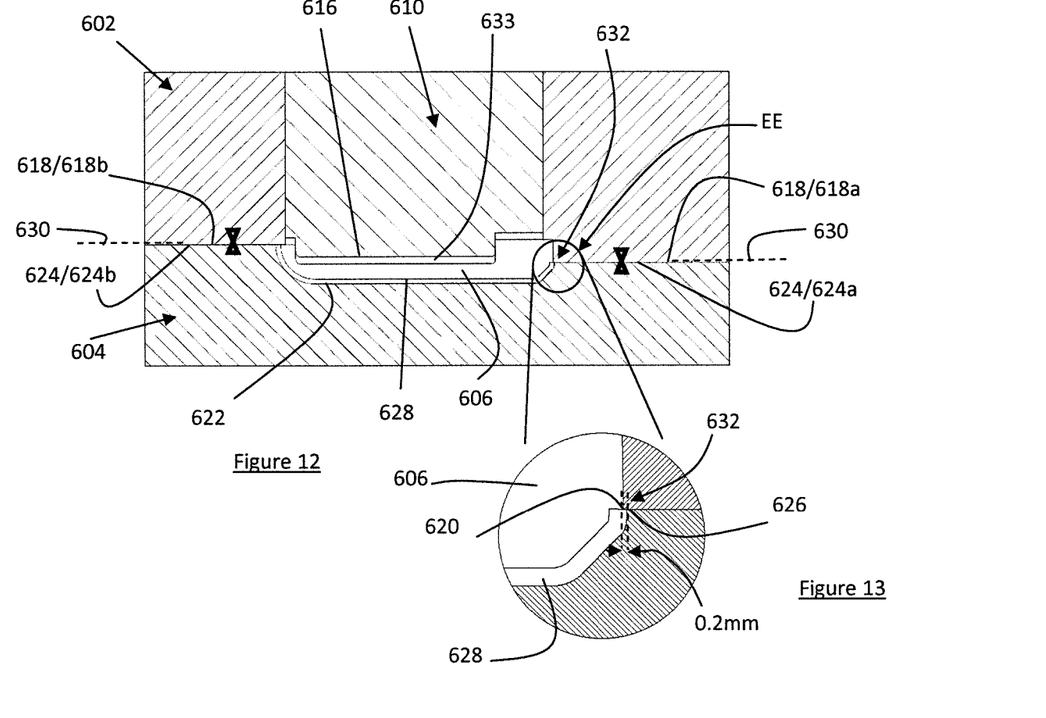
FIG. 12 illustrates the upper mould component and the lower mould component of FIG. 9 being moved to an initial moulding position to create an offset between the upper mould and the lower mould components.
FIG. 13 is an enlarged view of portion EE to show the offset more clearly.

At step 506, the injection moulding apparatus 600 activates the hydraulic mechanism to adjust a relative position between the upper mould component 602 and the lower mould component 604. Specifically, the upper mould component 602 is moved towards the lower mould component 604 until the upper mould component engagement surface 618 engages with the lower mould component engagement surface 624 at an initial moulding position to form a parting line 630 and the upper mould component moulding surface 616 cooperates with the lower mould component moulding surface 622 to define the shape and size of the mould cavity 606, as shown in FIG. 12. It should be appreciated that the initial moulding position is also defined by the upper mould front engagement surface 618a being engaged against the lower mould front engagement surface 624a and the upper mould rear engagement surface 618b being engaged against the lower mould rear engagement surface 624b.

It should be appreciated that there is an offset 632 between the upper mould component 602 and the lower mould component 604, as defined by a difference in alignment of the upper mould component moulding edge 620 relative to the lower mould component moulding edge 626. In this embodiment, the offset is 0.2 mm, and this is shown more clearly in FIG. 13. It should be apparent that this is to create the parting line offset 223 illustrated in FIG. 7.

In the initial moulding position shown in FIG. 12, the movable core 610 of the upper mould component 602 is spaced from the lower mould component moulding surface 622 by the lower mould cavity and a compression gap 633. In this embodiment, the compression gap 633 is 0.3 mm. One or more hot runner valve gate needles (not shown) are opened hydraulically, pneumatically or by servo motor and as illustrated in step 508, injection of molten material starts. In this embodiment, a defined volume of molten plastic of about 36 cm$^3$ is injected at step 510 at a pressure of 103 mpa and at an injection speed of 135 mm$^3$/sec via the injection channel (not shown) into the mould cavity 606 to allow the molten plastic to contact the film insert 628. In this embodiment, the moulding material is injected at a rate of 31 cc/sec.

Figure 14:
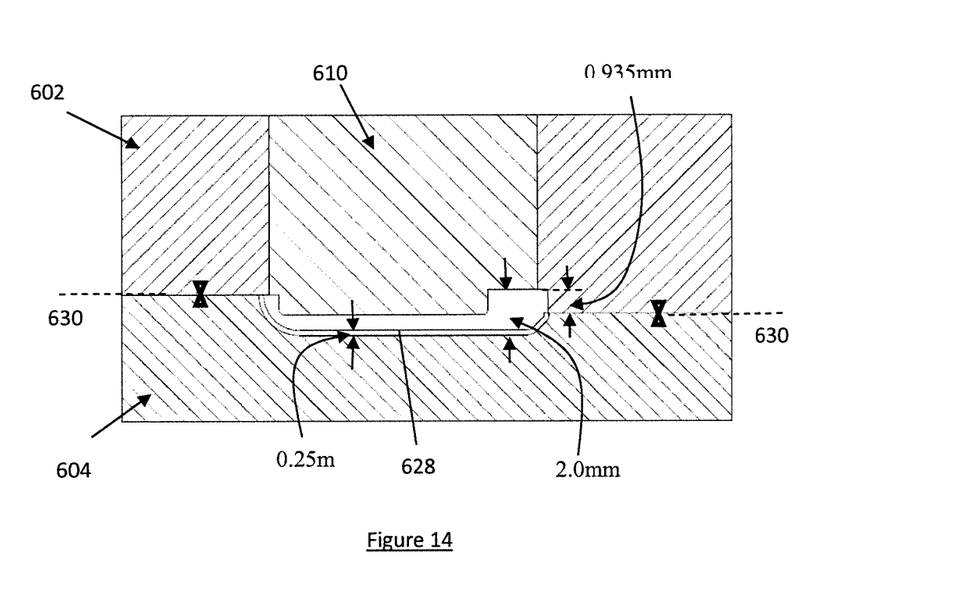
FIG. 14 shows the injection moulding apparatus of FIG. 12 with the upper mould component and the lower mould component in a position to compress the molten material.

Next, at step 512, the movable core 610 carrying the upper mould component moulding surface 616 is moved towards the mould cavity 606 at a pre-defined speed of 100 mm/sec and at a pre-defined force of 1000 KN to a pre-defined final position of zero mm to compress the molten material against the layer of film 628. In other words, the movable core 610 is moved relative to the upper mould component 602 to an intermediate moulding position to compress the molten material, as shown in FIG. 14. The whole process of injection and compression is completed within a space of about 0.6 seconds. The offset 632 along the parting line 630 serves the function of stopping the movement of the film insert 628 during the mould closing in step 506 and this prevents the film insert 628 from unnecessary movement. The compression stops when the cavity space 606 is completely filled with the molten plastic material and the final part thickness is thus reached including formation of the fine details such as the optical light waveguides 216.

Figure 15:
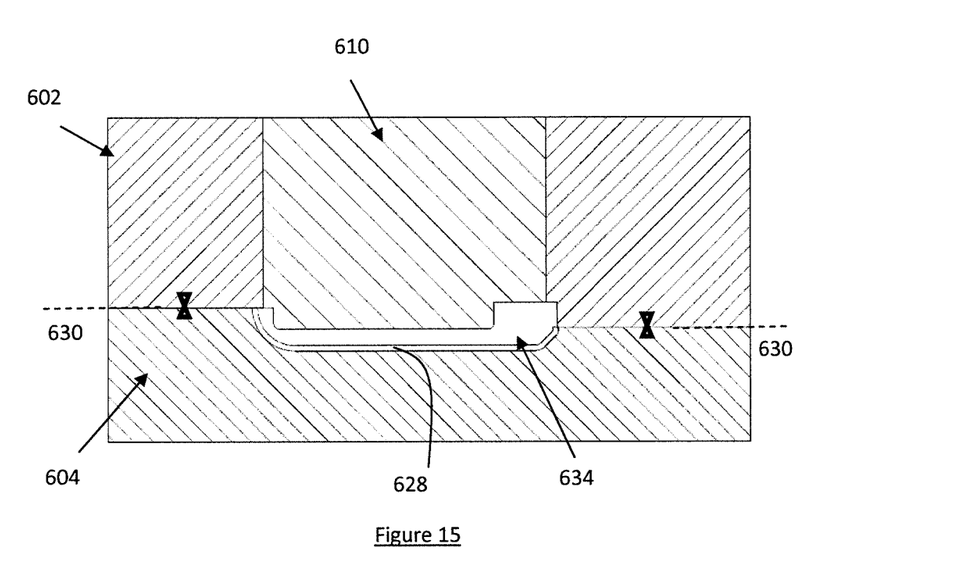
FIG. 15 shows the compressed molten material of FIG. 14 being cooled in situ to form a moulded article.

At step 514, the injection moulding apparatus 600 turns on a cooling mechanism (not shown) to cool the compressed molten plastic material in situ to a temperature of about 60° C. as shown in FIG. 15 i.e. when keeping the movable core 610 in the compressed position and this enables the film insert 628 to bond with the plastic material in order to form a moulded article 634.

Figure 16:
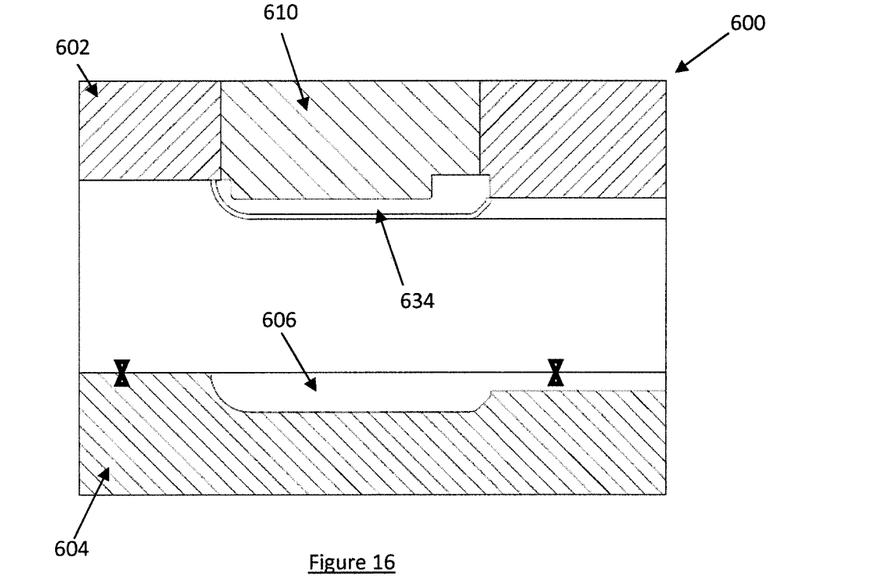
FIG. 16 shows the injection moulding apparatus of FIG. 15 being moved to an open position and with the moulded article stuck to the upper mould component.
Figure 17:
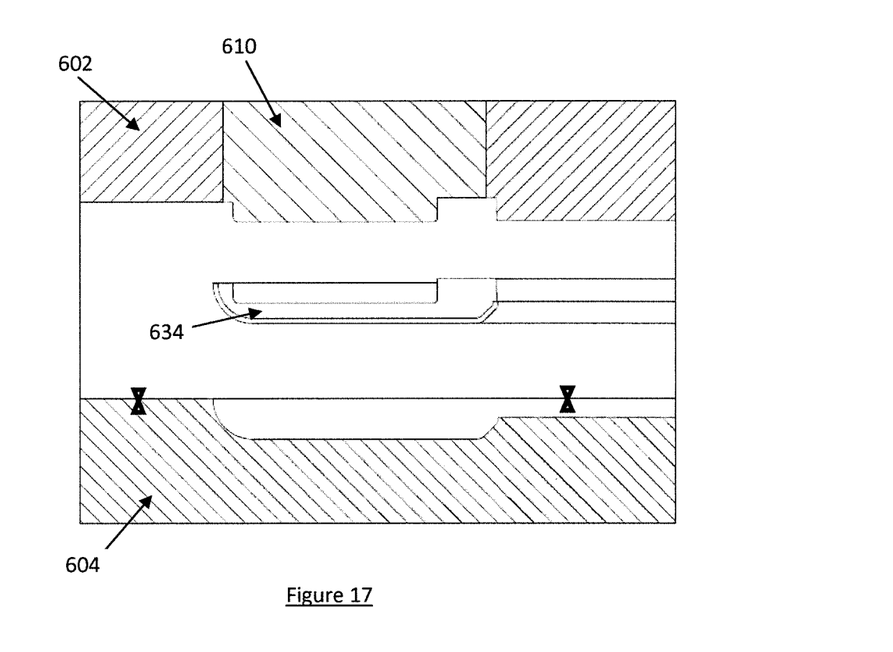
FIG. 17 shows the moulded article being ejected from the upper mould component.

At step 516, the upper and lower mould components 602, 604 open with the moulded article 634 stuck to the movable core 610 as shown in FIG. 16. Next, an ejector pin (not shown) is activated to eject the moulded article 634 at step 518 and a robotic arm holds on to the moulded article 634 as shown in FIG. 17 and the robotic arm carries the moulded article 634 and releases the moulded article 634 to a conveyor at step 520 for further processing and/or quality checks which then becomes the display frame 200.

It should be appreciated that manufacturing process of FIG. 8 in particular steps 508 to 512 are carried out at high speed, high pressure and high force and completed in less than 1 second, depending on the size of the moulded article. In this embodiment, for example, these steps may be completed in about 0.6 seconds.

Based on the described embodiment, which uses injection compression, it helps to produce light waveguides with minimal sink marks and thin wall plastic parts. This is executed by the follow three 'staggered simultaneous' movements:—
(1) The First movement is to inject the hot plastic material via a hot runner valve gate system through the core into the open cavity space.
(2) The Second movement (which begins towards the end of the First Movement, but before the First Movement is completed) is to slide back the mold core plate and shut the valve gate system as soon as the pre-defined plastic material is injected.
(3) The Third movement is to move the core forward and compress the injected plastic material until the final part wall thickness is achieved.

The described embodiment is able to minimize sink marks on the moulded article 634, and is able to achieve a much thinner moulded article 634 such as a wall thickness of 0.30 mm to 1.20 mm. Further, it is possible to minimize stress in the moulded article which is normally present from conventional high speed injection moulding of plastic resin. The described embodiment also minimizes warping, bending, twisting and distortion of the final moulded article.

In view of the offset 632 along the parting line 630, the described embodiment is able to achieve a more accurate formation of the optical waveguide 216 since the optical clearance 204 can be formed precisely. If the moulded article 634 includes the inlay 210, the described embodiment ensures that the inlay 210 is prevented from protruding beyond a certain location, and also ensures that light is blocked from exiting the display frame 200 where the light should not.

With the injection moulding method 500, the moulded article 634 (such as the display frame 200) may be formed as a single integrated part together with the optical light waveguide 216 in a single process step, termed as a "single shot" process. It should also be appreciated that there may be a number of optical light waveguides spaced from each other, but nonetheless, these light waveguides may similarly be integrally formed with the frame body 208. The light source for the grid may be invisible to the human eye (below 380 nm or above 780 nm) or the grid may be formed by light which is visible to the human eye (380 nm-780 nm). The arrangement of the array of LED transmitter and detector pairs may be in a pre-determined direction, whether sideways, perpendicular or in any pre-defined direction, or just onto the 3-dimensional part surface.

Such an ebook may provide other functions. For example, the ebook may use a light source which is visible to human eye and using the light waveguides which are built into the frame body 208 to illuminate (switch on and off) outer and/or inner circumference of the display frame, or to illuminate (switch on and off) symbols on the frame body 208 based on functions being executed or a message being displayed to the user on the device.

Based on the proposed method, a more accurate and yet smaller optical clearance 204 may be achieved. In this way, lights beams from the LED transmitters are able to pass through the light waveguide 216 and exit the light waveguide 216 to form respective light beams across the surface of the touch screen 104 and the light beams enter corresponding detectors on the other side of the frame 202. In this way, the infrared grid is formed. If one of the light beams is interrupted between its source and the detector, the detector and its electronics convert such interruption into electrical signals which can start or stop one or more functions, or to execute or automate one or more functions.

The precision of the infrared grid is defined by the space and direction between the light waveguides which generate the infrared grid, and can vary from less than 1 mm to any specified dimension. The function of this grid is that one side acts as a light beam source and the opposite side acts as a sensor (i.e. detector/receiver) of this radiation. The light waveguides which are built into the frame 202 are the physical connection between the light beam source (visible or invisible) and its exit point on the plastic surface on one side, and the opposite side of the plastic part where the same light beam enters a defined second light guide and is the physical connection to the sensor (receiver) and its electronics. The bonding of the inlay 210 with the plastic resin also strengthens and improves the structural rigidity of the display frame, and thereby enables the display frame to be thinner. In other words, the inlay 210 or film 628 may carry decorations, texture or haptic designs, and/or provide structural reinforcement to the display frame.

The described embodiments should not be construed as limitative. For example, the ebook may use either infrared red (IR) light or visible or other non-visible light source to generate the light grid. Also, the moulded article 634 may not be the display frame 200 and the moulded article 634 may be a frame for an electronic interactive display device, such as telephones (for example, smart phone display), personal computers (e.g. computer monitors or screens), electronic tablets or interactive display devices used in automotive vehicles or aircrafts (for example, GPS screens, entertainment or infotainment display devices on board cars or airplanes) etc.

In the described embodiment, the parting line offset 223 is indicated as 0.2 mm but this may vary between 0.2 mm to 0.4 mm.

Having now fully described the invention, it should be apparent to one of ordinary skill in the art that many modifications can be made hereto without departing from the scope as claimed.

The invention claimed is:
1. An IR-transmissible display frame for an IR-touch screen, the display frame comprising:
   a frame body comprising a top surface and a leading edge;
   a film formed over the top surface of the frame body and terminating at or adjacent to the leading edge; and
   an optical waveguide protruding from the frame body and towards the IR-touch screen and which allows IR light to pass through, the waveguide having an external wall from which the IR light exits the waveguide, wherein the external wall is spaced from the leading edge by a parting line offset, and wherein the parting line offset is in the range of 0.2 mm to 0.4 mm.

2. The IR-transmissible display frame according to claim 1, wherein the optical waveguide is integrally formed with the frame body.

3. The IR-touch electronic device comprising the display frame of claim 1.

* * * * *